(12) United States Patent
Brok

(10) Patent No.: US 10,414,389 B2
(45) Date of Patent: Sep. 17, 2019

(54) METHOD FOR IMPRINTING HAPTIC FEEDBACK ON A BRAKE PEDAL

(71) Applicant: AUDI AG, Ingolstadt (DE)

(72) Inventor: Tobias Brok, Kösching (DE)

(73) Assignee: AUDI AG, Ingolstadt (DE)

( * ) Notice: Subject to any disclaimer, the term of this patent is extended or adjusted under 35 U.S.C. 154(b) by 3 days.

(21) Appl. No.: 15/696,761

(22) Filed: Sep. 6, 2017

(65) Prior Publication Data

US 2018/0065606 A1    Mar. 8, 2018

(30) Foreign Application Priority Data

Sep. 8, 2016   (DE) .................. 10 2016 217 144

(51) Int. Cl.
| | |
|---|---|
| *B60T 8/1755* | (2006.01) |
| *B60T 8/17* | (2006.01) |
| *B60T 13/74* | (2006.01) |
| *B60T 8/32* | (2006.01) |
| *B60T 8/1761* | (2006.01) |
| *B60T 8/1763* | (2006.01) |
| *B60T 8/40* | (2006.01) |

(Continued)

(52) U.S. Cl.
CPC .......... *B60T 8/4081* (2013.01); *B60K 26/021* (2013.01); *B60T 7/042* (2013.01); *B60T 8/1755* (2013.01); *B60T 8/17551* (2013.01); *B60T 8/32* (2013.01); *B60T 13/662* (2013.01); *B60T 13/746* (2013.01); *B60T 17/22* (2013.01); *B60T 8/4072* (2013.01); *B60T 8/4872* (2013.01); *B60T 11/18* (2013.01); *B60T 2210/36* (2013.01); *B60T 2220/03* (2013.01); *B60T 2220/04* (2013.01); *B60T 2250/03* (2013.01); *B60T 2270/404* (2013.01); *B60T 2270/82* (2013.01)

(58) Field of Classification Search
CPC .... B60T 7/042; B60T 8/4081; B60T 2220/04; B60T 2270/82; B60T 8/4072; B60T 8/4086
See application file for complete search history.

(56) References Cited

U.S. PATENT DOCUMENTS

| | | | | |
|---|---|---|---|---|
| 10,293,878 | B2 * | 5/2019 | Corno | ...................... B62J 99/00 |
| 2009/0319127 | A1 * | 12/2009 | Ghoneim | ................. B60Q 9/00 |
| | | | | 701/41 |

(Continued)

FOREIGN PATENT DOCUMENTS

| | | |
|---|---|---|
| DE | 19920848 A1 | 5/2000 |
| DE | 10213904 A1 | 10/2003 |

(Continued)

OTHER PUBLICATIONS

German Search Report dated Jun. 13, 2017 of corresponding German application No. 102016217144.5; 10 pgs.

(Continued)

*Primary Examiner* — Alison Slater

(74) *Attorney, Agent, or Firm* — Maier & Maier, PLLC

(57) ABSTRACT

A method for haptic feedback on a brake pedal of a motor vehicle. A current stability index describing the current driving situation is compared to a stored critical stability index. A haptic feedback is imprinted on the brake pedal of the motor vehicle when the ratio between the current stability index and the critical stability index exceeds a previously defined limit value.

7 Claims, 1 Drawing Sheet

(51) Int. Cl.
*B60T 7/04* (2006.01)
*B60K 26/02* (2006.01)
*B60T 13/66* (2006.01)
*B60T 17/22* (2006.01)
*B60T 11/18* (2006.01)
*B60T 8/48* (2006.01)

(56) References Cited

U.S. PATENT DOCUMENTS

| | | | | |
|---|---|---|---|---|
| 2010/0114444 A1* | 5/2010 | Verhagen | ............... | B60T 7/042 701/70 |
| 2010/0245123 A1* | 9/2010 | Prasad | ................... | B60T 8/175 340/870.41 |
| 2014/0222272 A1* | 8/2014 | Raste | ................... | B60T 8/1755 701/22 |
| 2015/0061854 A1* | 3/2015 | Drumm | ................... | B60T 7/042 340/453 |
| 2015/0344014 A1* | 12/2015 | Knechtges | ............. | B60T 7/042 701/70 |
| 2017/0001646 A1* | 1/2017 | Cooke | ................. | B60W 50/082 |

FOREIGN PATENT DOCUMENTS

| | | |
|---|---|---|
| DE | 10262003 A1 | 3/2004 |
| DE | 10262003 B4 | 8/2007 |
| DE | 102007045292 A1 | 4/2009 |
| DE | 102008064645 A1 | 4/2010 |
| DE | 102013204778 A1 | 9/2013 |
| DE | 102013224313 A1 | 9/2014 |
| DE | 102013222281 A1 | 11/2014 |
| WO | 2004085220 A1 | 10/2004 |

OTHER PUBLICATIONS

European Search Report dated Jan. 31, 2018 of corresponding European application No. EP17184742.9; 7 pgs.

\* cited by examiner

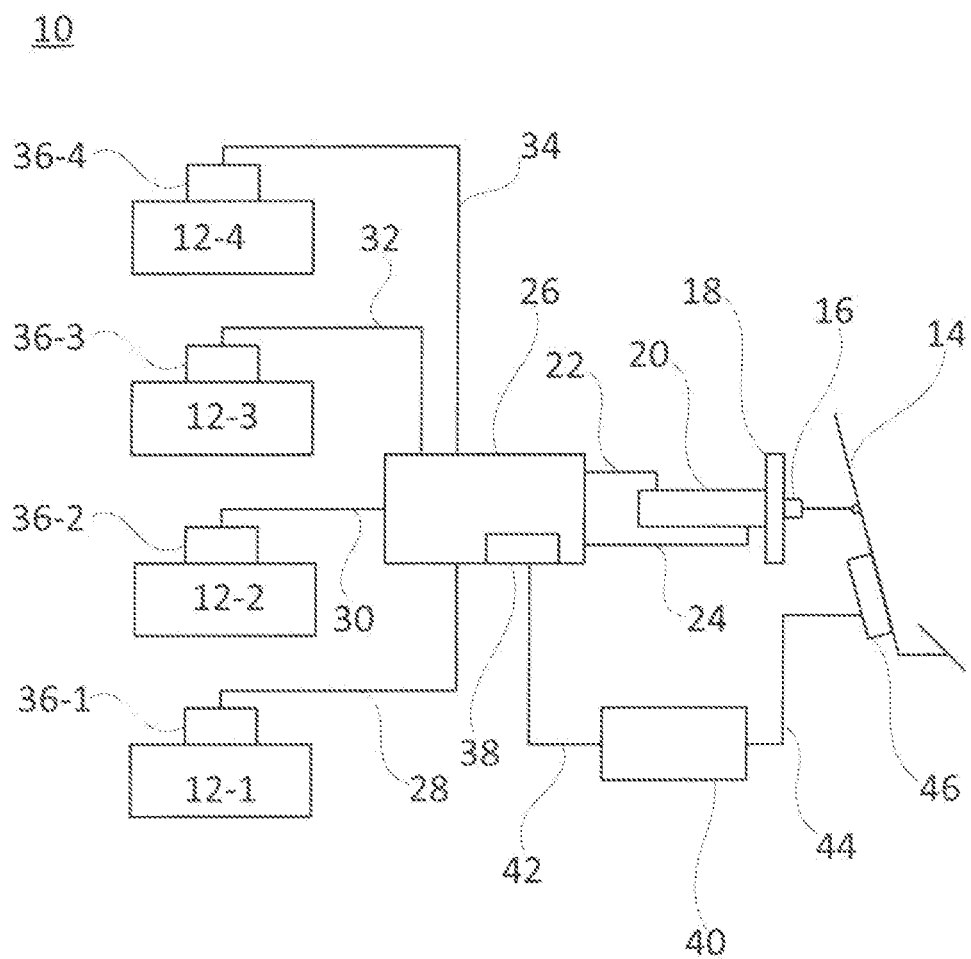

METHOD FOR IMPRINTING HAPTIC FEEDBACK ON A BRAKE PEDAL

FIELD

A method for haptic feedback on a brake pedal of a motor vehicle.

BACKGROUND

Methods for haptic feedback on a brake pedal of a motor vehicle are sufficiently known from the prior art. Reference is made to DE 102 62 003 B4 and DE 10 2013 224 313 A1 merely as examples. The methods known in the prior art for haptic feedback are characterized particularly in that, in the event of a critical driving situation, a driver of a motor vehicle is notified of a response of an assistance system, such as, for example, intervention of an antilock braking system (ABS), which is brought about due to the critical driving situation.

SUMMARY OF THE DISCLOSURE

The object of the invention is to further develop or enhance a method for imprinting haptic feedback on a brake pedal such that improved driving safety is ensured.

The dependent claims form advantageous enhancements of the invention.

The method according to the invention for haptic feedback on a brake pedal of a motor vehicle is characterized in that a current stability index describing the current driving situation is compared to a stored critical stability index, in which a haptic feedback is informed on the brake pedal of the motor vehicle when the ratio between the current stability index and the critical stability index exceeds a previously defined limit value.

The method according to the invention has the effect that, due to the comparison of the current stability index to the stored critical stability index, a driver of the motor vehicle is informed of a threatening instability of the motor vehicle on the brake pedal before reaching the physical limits of the driving dynamics. This has proven to be especially advantageous, because the driver then receives "proactive" feedback that places the driver in a position of undertaking corresponding countermeasures early enough, as needed, so that the physical limits of the driving dynamics are not exhausted and thus increased traffic safety is ensured.

Preferably, the current stability index here is provided by an electronic stability program (ESP).

As an alternative, it is conceivable for the current stability index to be determined using the data provided by sensors present in the braking system and motor vehicle such as, for example, pressure in the braking system, temperature in the braking system, acceleration, rotational speed of the wheels, yaw, roll, pitch, lateral acceleration, and/or GPS data.

A first embodiment provides that the motor vehicle has a braking system with an actuator that can be activated by way of a control device and that forms an operative connection with the brake pedal, in which the haptic feedback is imprinted on the brake pedal by means of the actuator.

Another embodiment provides that the motor vehicle has an electromechanical brake booster in the braking system controllable by way of a control device, in which the haptic feedback is imprinted on the brake pedal by means of an intermittent powering of the electromechanical brake booster of the braking system of the motor vehicle.

According to another embodiment, it is provided that the motor vehicle has a brake-by-wire braking system with hydraulic fallback levels and a pedal simulator controllable by way of a control device, in which the haptic feedback is imprinted on the brake pedal by means of valve actuation in the hydraulic fallback level.

An especially advantageous embodiment of the method according to the invention provides that the haptic feedback is continuously enhanced with increasing approximation of the current stability index to the stored critical stability index. Due to the continuous enhancement of the haptic feedback, the driver is provided with additional information, namely the information that the driver is approaching the physical limit range of the driving dynamics. This has the effect that, for example, a sports-minded driver is given the option of "cautiously approaching" the physical limits of the driving dynamics of his/her motor vehicle.

Preferably in this case, the haptic feedback takes place in the form of an oscillation or vibration imprinted on the brake pedal.

Another advantageous embodiment provides that the continuous enhancement of the haptic feedback takes place through continuously increasing the frequency and/or the amplitude of the oscillation.

BRIEF DESCRIPTION OF THE DRAWINGS

Further advantages and application possibilities for the present invention result from the following description in conjunction with the exemplary embodiment shown in the drawing.

The following is indicated:

FIG. 1 shows a schematic representation of a braking system of a motor vehicle.

DETAILED DESCRIPTION OF THE DRAWINGS

FIG. 1 shows a braking system characterized overall with the reference number 10 for wheels 12-1 to 12-4 of a motor vehicle.

The braking system 10 is executed here as a hydraulic dual-circuit braking system and comprises, in the known type and manner, a brake pedal 14, a sensor 16 for detecting or recording a braking request of the driver, a brake booster 18, as well as a tandem brake master cylinder 20.

The tandem brake master cylinder 20 forms an operative connection with a hydraulic unit 26, by way of a first and a second hydraulic line 22, 24, with the hydraulic unit 26 being connected to the wheels 12-1, 12-2, 12-3, and 12-4 of respectively allocated brake cylinders 36-1, 36-2, 36-3, and 36-4, via hydraulic lines 28, 30, 32, 34. The hydraulic unit 26 has multiple valves, which are not shown here, allocated to the hydraulic lines 28, 30, 32, 34, as well as an ESP control device 38 controlling and/or regulating the valves of the hydraulic lines 28, 30, 32, 34.

Furthermore, the braking system 10 comprises a control/regulating unit 40, which forms an operative connection with the ESP control device 38 on the input side via a control line 42 and which forms an operative connection with an actuator 46 allocated to the brake pedal 14 on the output side via a control line 44. A current stability index describing the current driving situation is provided to the regulating/control unit 40 by the ESP control device 38 as an input variable via the control line 42.

The current stability index is compared to a stored critical stability index in the control/regulating control unit 40. If the comparison indicates that the ratio between the current stability index and the critical stability index is exceeding a previously defined limit value, the actuator 46 will be activated via the control line 44.

The actuator 46 causes an oscillation of the brake pedal 14, so that the driver proactively receives the haptic feedback that the driver is about to exhaust the limits of the physical driving dynamics.

The invention claimed is:

1. A method for haptic feedback on a brake pedal of a motor vehicle, comprising:
   a current stability index describing the current driving situation is compared to a stored critical stability index, wherein a haptic feedback is imprinted on the brake pedal of the motor vehicle when a ratio between the current stability index and the critical stability index exceeds a previously defined limit value;
   wherein the haptic feedback is continuously increased in frequency and amplitude of oscillation as the current stability index approaches the stored critical stability index.

2. The method according to claim 1, wherein the current stability index is provided by an electronic stability program (ESP) of the braking system of the motor vehicle.

3. The method according to claim 1, wherein the current stability index is determined using the data provided by at least one sensor present in the braking system or elsewhere in the motor vehicle, wherein the data comprises at least one of: pressure in the braking system, temperature in the braking system, acceleration, rotational speed of the wheels, yaw, roll, pitch, lateral acceleration, and GPS data.

4. The method according to claim 1, wherein the motor vehicle has a braking system with an actuator configured to activate by way of a regulating/control unit and that forms an operative connection with the brake pedal, wherein the haptic feedback is imprinted on the brake pedal by means of the actuator.

5. The method according to claim 3, wherein the motor vehicle has an electromechanical brake booster in the braking system configured to activate by way of a control device, wherein the haptic feedback is imprinted on the brake pedal by an intermittent powering of the electromechanical brake booster of the braking system of the motor vehicle.

6. The method according to claim 1, wherein the motor vehicle has a brake-by-wire braking system with hydraulic fallback levels and a pedal simulator activated by way of a control device, wherein the haptic feedback is imprinted on the brake pedal by means of valve actuations in the hydraulic fallback level.

7. The method according to claim 1, wherein the haptic feedback is hydraulically-actuated.

* * * * *